Patented Jan. 6, 1925.

1,522,405

UNITED STATES PATENT OFFICE.

RAIKICHI ARIMA, OF OSAKA, JAPAN.

PROCESS OF PRODUCING A PREPARATION FROM THE TUBERCLE BACILLUS.

No Drawing.   Application filed August 16, 1922.   Serial No. 582,302.

*To all whom it may concern:*

Be it known that I, RAIKICHI ARIMA, a subject of the Emperor of Japan, and a resident of No. 41, 4-chome, Kitahama, Higashi-ku, Osaka, Japan, have invented a new and useful Improvement in Processes of Producing a Preparation from the Tubercle Bacillus, of which the following is a specification.

My invention relates to process of producing a preparation from the tubercle bacillus or immunitical prophylaxis and therapeutics of tuberculosis, and the object of my invention is to provide special antigen for real immunity to the infection of the tubercle bacillus by obtaining extremely weak typus humanus and typus bovinus, and to succeed in prophylaxis and therapeutics of human or bovine tuberculosis.

The novel feature of my invention will be pointed out with greater particularity in the appended claims and described in detail in the following description.

It has been impossible to obtain real immunity to the infection of the tubercle bacillus by antigen of tubercle bacillus, such as dead tubercle bacillus, its ingredient, tuberculin or the like. My invention has its base on my discovery of the fact that, in a solution of saponin or lipase, the tubercle bacillus is not weakened but preserves its vitality and may be deprived of the fat and lipoide in its body by physical dissolution in saponin or by chemical decomposition by lipase. In other words, a sort of special cultivation of the tubercle bacillus free from fat and lipoide can be obtained by cultivating the tubercle bacillus initially in a liquid or solid state, and then dissolving the same in a saponin solution either animal or vegetable, for a predetermined period, and then subjecting the same to chemical decomposition by the action of lipase, to exclude all fat and fatty substances in the bacillus, without injuring the vitality thereof and without depriving the same of albumen. The preparation from the tubercle bacillus thus produced is avirulent and harmless to human and bovine bodies and preserves the speciality of the whole albumen of the bacillus, viz. has the character of the antigen completely.

For a more complete understanding of my invention, I describe a practical example thereof as follows.

Media free from albumen, for example, liquid media of weak acid or neutral consisting of 3.0 grams of natrium phosphoricum, 4.0 grams of kalium phosphoricum, 0.6 grams of magnesium citricum, 10.0 grams of natrium glutaminicum and 20.0 grams of glycerin or 10.0 grams of saccharium amylacceum with 1,000.0 grams of water, or rigid media which is obtained by adding 2—3% of refined agar to the above liquid media, is mixed with 0.1–5.0% of neutral saponin. Weak virulent tubercle bacilli are then inoculated the said media, and cultivated for six weeks to 4 months, during which period bacilli nearly free from fat and lipoide are obtained. These bacilli are collected and poured into a 0.05–5.0% solution of ricimus-lipase which is kept under a temperature of some 35 degrees centigrade for 48 hours, and shaken from time to time. This causes the decomposition of fat, which is insoluble to saponin, and the remarkable reaction of fatty acid occurs. By the above method, tubercle bacilli are completely deprived of fat and lipoide, which are injurious and useless as far as the study of the immunity of the tuberculosis is concerned, and their acid-proof and alcohol-proof properties are abolished. In this process, lipase and saponin may be substituted for each other, but in the whole process the two materials must be used coadjutantly in either order, otherwise the desired result can not be obtained. That is to say, the independent use of any one of them can obtain tubercle bacilli deficient in acid-proof and alcohol-proof properties, but can not effect the complete abolishment of these properties, because of the fact that fat and lipoide of living tubercle bacilli are not simple in kind, some of them being partly insoluble to saponin while others partly indecomposable to lipase, and therefore the complete exclusion of fat and lipase from living tubercle bacilli can only be accomplished by coadjutant use of these two materials.

Tubercle bacilli obtained as above are rinsed several times by sterilized physiological salt-solution, and then centrifugated and dehydrated. Then they are kept in a refrigerating room for 24 hours to be half-dried to a predetermined degree. After this treatment they are weighed and prepared for the market as a homogeneous emulsion of a desirable concentration.

In my present process, every treatment is done under severe sterilization in tightly sealed sterilized apparatus, and no treatment is done such as to weaken the vitality of bacillus or to change the albumen ingredient in the bacillus body, that is, no antiseptic is added nor are the bacilli exposed to heat or light.

My process is also applicable to ordinarily cultivated tubercle bacilli, and the same preparation can be obtained therefrom.

The tubercle bacilli thus obtained are living, and therefore they may be reduced to ordinary tubercle bacilli, if they are transplanted to an ordinary nutrient medium.

Experiments on animals show that one dose of my preparation is avirulent and harmless to a healthy rabbit, while one to three times successive inoculation thereof make it immune to tubercle bacilli of two to ten infective doses. To a guinea-pig which is most sensible to tubercle bacilli, a slightly larger quantity of my preparation, say 1/1000 to 1/100 milligram, is avirulent and harmless, and effective to its prophylactic immunity. Thus a simple immunitical treatment can provide a great protective power against bacillus.

If my preparation is applied to a tuberculous patient, a larger quantity, say 0.1 milligram, seldom fails to show extremely slight local reaction, and never effect violent virulence as in the case of tuberculin. One or several inoculations lessen or exclude the sypmtoms and bacilli in sputum, and remarkably increase the body weight. There has never existed such an effective and simple therapeutics as this.

The immunitical experiments and literatures on tuberculosis show that the immunity by dead tubercle bacillus, tuberculin or the like, is so complicated and needs so many days in application as to be not practical. Moreover, dead tubercle bacillus has no prophylactic effect, and is very indefinite or uncertain in therapeutical effect. Strictly speaking, therefore, they can not be called as affording tuberculosis immunity. Real immunity can only be accomplished by use of the antigen of the living tubercle bacillus. The ordinary living tubercle bacillus, however, even if it is avirulent to living bodies, is not harmless, because it forms a tubercle nodule or abscess at the applied location, and therefore can not be used in sufficient quantity to effect immunity. This is because of fat and lipoide in the bacillus body which are ineffective. Immunity can only be effected by the albuminous body of the living bacillus preserving its speciality. Many attempts have been made, in vain, to obtain such a special living bacillus free from fat and lipoide, using natrium oleinicum, gall, its constituent, or every kind of fats or mineral oils.

My invention has really succeeded in obtaining such a special living bacillus free from fat and lipoide. By my process, micro-organisms or bacilli can preserve their vitality and develop despite the lack of a part of their character, while these bacilli are avirulent or weak virulent even to a very sensible test animal, and only one or several times inoculations thereof can effect prophylactic immunity against tubercle bacillus, and avirulent and harmless to tuberculous human body. The application is very simple and the immunitical and therapeutical effect is remarkable.

Modifications and changes may be made without departing from the spirit and scope of my invention.

Having now particularly described and ascertained my invention, what I claim as new and desire to secure by Letters Patent is:

1. The herein described process of producing a preparation of tubercle bacilli, consisting in dissolving the same in saponin, and subjecting the same to chemical decomposition by the action of lipase.

2. The herein described process of producing a preparation of tubercle bacilli, consisting in inoculating the same in a media free from albumen and containing saponin, cultivating the same to obtain bacilli substantially free from fat and lipoide, and adding the same to a solution of ricimus-lipase.

3. The herein described process of producing a preparation of tubercle bacilli, consisting in depriving the same of fat and lipoide and retaining the albuminous body thereof by the coadjutant use of lipase and saponin thereon.

In testimony whereof I affix my signature in presence of two witnesses.

RAIKICHI ARIMA.

Witnesses:
W. CHIHARAH,
LETSUJIRO KOTANO.